(12) United States Patent
Dee

(10) Patent No.: US 9,595,272 B2
(45) Date of Patent: *Mar. 14, 2017

(54) MAGNETIC MEDIA ACCESS HEAD WITH METAL COATING

(71) Applicant: Quantum Corporation, Redmond, WA (US)

(72) Inventor: Richard Henry Dee, Boulder, CO (US)

(73) Assignee: Quantum Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,332

(22) Filed: Oct. 5, 2015

(65) Prior Publication Data
US 2016/0027454 A1    Jan. 28, 2016

Related U.S. Application Data

(63) Continuation of application No. 14/594,790, filed on Jan. 12, 2015, now Pat. No. 9,153,259, which is a continuation of application No. 13/550,144, filed on Jul. 16, 2012, now Pat. No. 8,934,197.

(51) Int. Cl.
| | |
|---|---|
| *G11B 5/255* | (2006.01) |
| *G11B 5/31* | (2006.01) |
| *G11B 5/40* | (2006.01) |
| *G11B 5/147* | (2006.01) |
| *G11B 5/84* | (2006.01) |

(52) U.S. Cl.
CPC ............ *G11B 5/255* (2013.01); *G11B 5/1475* (2013.01); *G11B 5/3106* (2013.01); *G11B 5/40* (2013.01); *G11B 5/84* (2013.01); *Y10T 29/49032* (2015.01)

(58) Field of Classification Search
None
See application file for complete search history.

(56) References Cited

U.S. PATENT DOCUMENTS

| | | |
|---|---|---|
| 4,837,924 A | 6/1989 | Lazzari |
| 5,491,605 A | 2/1996 | Hughbanks et al. |
| 5,513,057 A | 4/1996 | Zieren et al. |
| 5,903,416 A * | 5/1999 | Chung ................. G11B 5/255 360/122 |
| 6,331,924 B1 | 12/2001 | Takada |
| 6,416,935 B1 | 7/2002 | Hsiao et al. |

(Continued)

OTHER PUBLICATIONS

Zieren, V. and De Jongh, M., "Ultra thin Wear-resistant coatings for the tape bearing surface of thin-film magnetic heads for digital compact cassette", IEEE Transactions on Magnetics, vol. 30, No. 2, pp. 340-345 (Mar. 1994), 6 pages.

(Continued)

*Primary Examiner* — Craig A. Renner

(57) ABSTRACT

Embodiments disclosed herein provide magnetic media access heads with metal coatings. In a particular embodiment, a magnetic media head for accessing magnetic media comprises a base substrate configured to support a magnetic head layer. The magnetic head layer is formed on the base substrate and configured to magnetically access the magnetic media. A metallic layer formed over the magnetic head layer and disposed between the magnetic head layer and the magnetic media when the magnetic media is positioned for access by the magnetic head layer.

17 Claims, 4 Drawing Sheets

(56) References Cited

U.S. PATENT DOCUMENTS

| | | | |
|---|---|---|---|
| 6,424,489 B1 * | 7/2002 | Dirne et al. | G11B 5/255 |
| | | | 360/122 |
| 6,427,319 B1 | 8/2002 | Cook et al. | |
| 8,934,197 B2 * | 1/2015 | Dee | G11B 5/255 |
| | | | 360/122 |
| 9,153,259 B2 * | 10/2015 | Dee | G11B 5/255 |
| 2008/0062579 A1 * | 3/2008 | Yasui et al. | G11B 5/3163 |
| | | | 360/110 |
| 2009/0240904 A1 | 9/2009 | Austruy et al. | |

OTHER PUBLICATIONS

Sourty, E., Sullivan, J.L. and Dejong, L.A.M., "Pole tip recession in linear recording heads", IEEE Transactions on Magnetics, vol. 39, No. 3, pp. 1859-1861 (May 2003), 3 pages.

Theunisssen, G. S. A. M., "Thin wear-resistant tetragonal zirconia coatings for thin-film magnetic recording heads", Journal of Materials Science Letters vol. 17, 1235 (1998), 1 page.

* cited by examiner

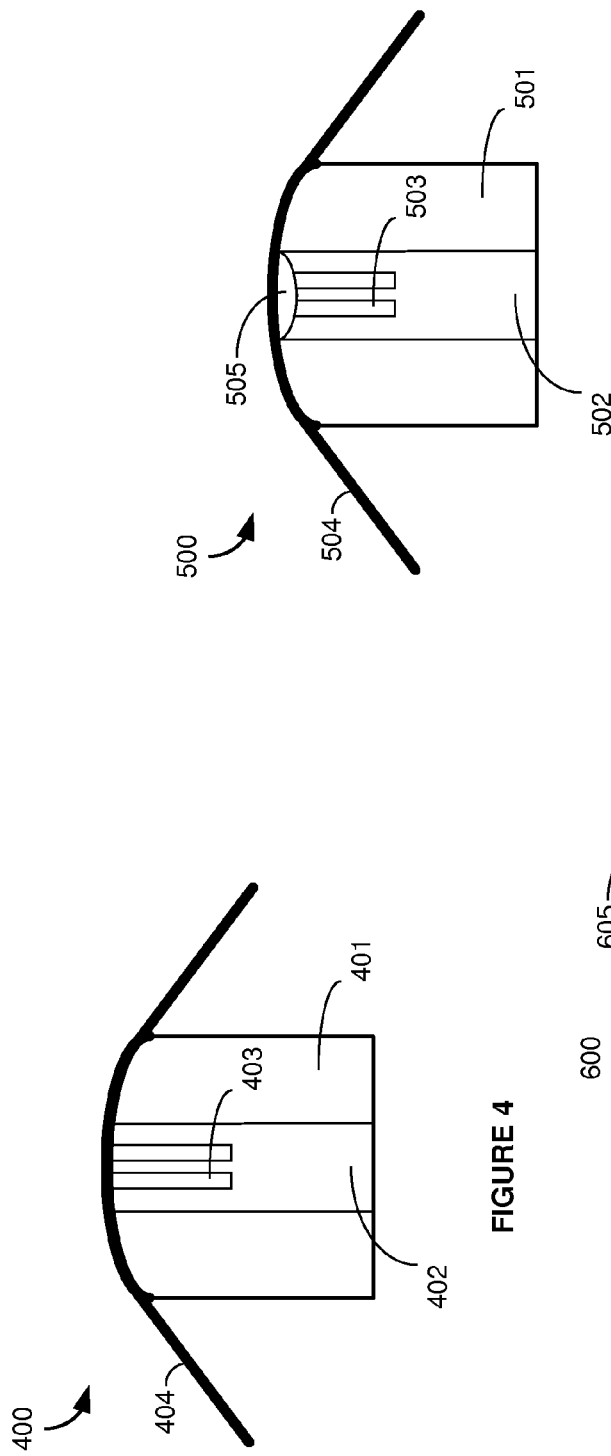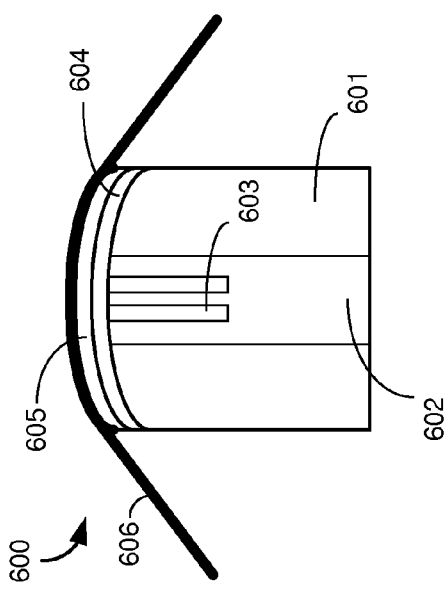

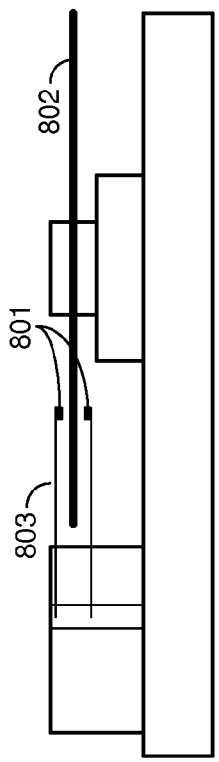
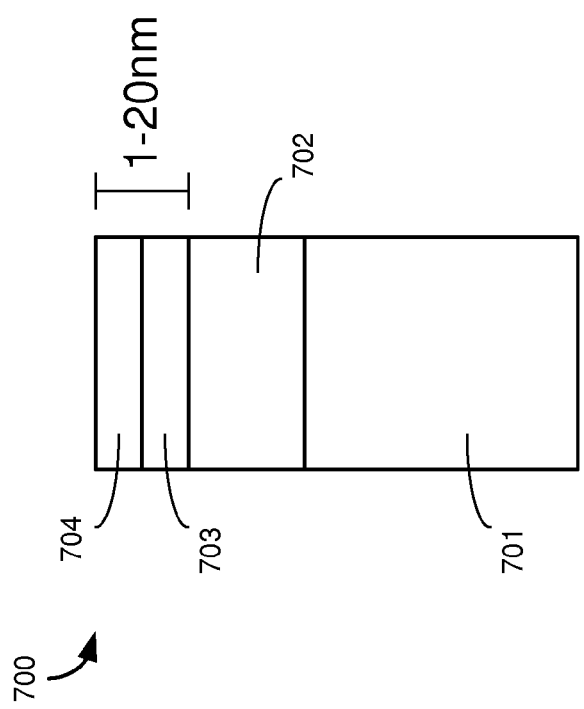

MAGNETIC MEDIA ACCESS HEAD WITH METAL COATING

RELATED APPLICATIONS

This application is a continuation of U.S. Pat. No. 9,153,259, entitled "MAGNETIC MEDIA ACCESS HEAD WITH METAL COATING," filed on Jan. 12, 2015, which is a continuation of U.S. Pat. No. 8,934,197, entitled "MAGNETIC MEDIA ACCESS HEAD WITH METAL COATING," filed on Jul. 16, 2012, and which is hereby incorporated by reference in their entirety.

TECHNICAL BACKGROUND

Magnetic media has been used for decades because it can reliably store large amounts of data for long periods of time. Magnetic tapes, in particular, are able to store very large amounts of data and are relatively inexpensive when compared to the costs of other magnetic and non-magnetic storage mediums. Hence, even though magnetic tape requires sequential access, which usually does not allow quick access to data items stored thereon, magnetic tape is a very efficient way to back up large amounts of data as a failsafe for faster storage mediums, such as magnetic hard disk drives.

When data is read from or written to magnetic tape, a magnetic tape head must contact the magnetic tape as the magnetic tape passes over the magnetic tape head. This contact causes friction that wears on the magnetic tape head. Over time the magnetic tape head wears down to the point that the magnetic tape head can no longer access the magnetic tape and needs to be replaced.

To extend the life of magnetic tape heads, coatings made of insulating materials have been used. While these insulating coatings do provide a certain amount protection from wear for magnetic tape heads, the insulating materials are still insufficiently durable. Thus, even with the insulating coatings, magnetic tape heads need to be replaced relatively frequently.

OVERVIEW

Embodiments disclosed herein provide magnetic media access heads with metal coatings. In a particular embodiment, a magnetic media head for accessing magnetic media comprises a base substrate configured to support a magnetic head layer. The magnetic head layer is formed on the base substrate and configured to magnetically access the magnetic media. A metallic layer formed over the magnetic head layer and disposed between the magnetic head layer and the magnetic media when the magnetic media is positioned for access by the magnetic head layer.

In some embodiments, the metallic layer prevents contact between the magnetic head layer and the magnetic media to prevent wear on the magnetic head layer.

In some embodiments, the magnetic media comprises magnetic tape.

In some embodiments, the magnetic media comprises a magnetic disk.

In some embodiments, an insulator layer is formed between the magnetic head layer and the metallic layer.

In some embodiments, the metallic layer is composed of titanium, platinum, tungsten, or any other metal or metal alloy.

In some embodiments, the metallic layer is from 1 nanometer to 20 nanometers in thickness.

In some embodiments, magnetically accessing the magnetic media comprises reading data from or writing data to the magnetic media.

In a further embodiment, a method is provided of operating a magnetic media head for accessing magnetic media. The method comprises providing the magnetic media head comprising a base substrate configured to support a magnetic head layer, the magnetic head layer formed on the base substrate and configured to magnetically access the magnetic media, and a metallic layer formed over the magnetic head layer and disposed between the magnetic head layer and the magnetic media when the magnetic media is positioned for access by the magnetic head layer. The method further comprises positioning the magnetic media for access by the magnetic head layer and moving the magnetic media relative to the magnetic head layer to magnetically access the magnetic media.

In a further embodiment, a magnetic tape access system is provided comprising a controller for a magnetic tape head. The system further comprises a magnetic tape head assembly comprising a base substrate configured to support a magnetic head layer, the magnetic head layer formed on the base substrate and configured to magnetically access the magnetic tape, a metallic layer formed over the magnetic head layer and disposed between the magnetic head layer and the magnetic tape when the magnetic media is positioned for access by the magnetic head layer.

In some embodiments, the system further comprises a first reel configured to rotate a first corresponding reel of the magnetic tape in a cartridge enclosing the magnetic tape, a second reel configured to rotate a second corresponding reel of the magnetic tape in the cartridge enclosing the magnetic tape, and a plurality of guides for guiding the magnetic tape laterally over the magnetic tape head assembly as the first and second reels rotate.

BRIEF DESCRIPTION OF THE DRAWINGS

FIG. 4 illustrates a magnetic tape head.

FIG. 5 illustrates a magnetic tape head.

FIG. 6 illustrates a magnetic tape head.

FIG. 7 illustrates a cross section of a magnetic media access head.

FIG. 8 illustrates a magnetic disk drive.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
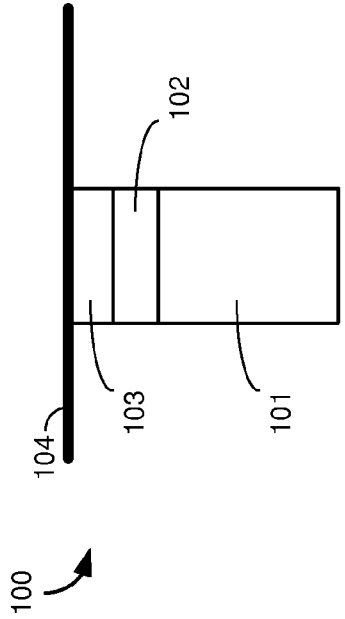
FIG. 1 illustrates a magnetic media access head.

FIG. 1 illustrates a profile view magnetic media access head 100. Magnetic media access head 100 includes base substrate 101, magnetic head layer 102, and metallic layer 103. FIG. 1 further illustrates magnetic media 104 although magnetic media 104 may not always be present when not being accessed by magnetic media head 100. FIG. 1 illustrates that magnetic media 104 is touching magnetic head 100. However, in some embodiments, magnetic media 104 need not be touching magnetic head 100 in order for magnetic head 100 to access magnetic media 104. Furthermore, FIG. 1 is not necessarily drawn to scale.

Base substrate 101 is configured to support magnetic head layer 102. Magnetic head layer 102 is formed on base substrate 101 and is configured to magnetically access magnetic media 104. Metallic layer 103 is formed over magnetic head layer 102 and is disposed between magnetic head layer 102 and magnetic media 104 when magnetic media 104 is positioned for access by magnetic head layer 102.

Magnetic media head 100 is illustrated in a profile view to show how the layers are placed relative to one another. Therefore, magnetic media head 100 may take any other shape besides that shown in FIG. 1. Similarly, the shapes of base substrate 101, magnetic head layer 102, and metallic layer 103, individually, may take other shapes. For example, magnetic head layer 102 may be inset into base substrate 101 and metallic layer 103 may be formed to cover both magnetic head layer 102 and at least a portion of base substrate 101.

Base substrate 101 may be composed of aluminum oxide titanium carbide (AlTiC), calcium titanate (CaTiO$_3$), or other material that may support magnetic head layer 102. Magnetic head layer 102 may be composed of nickel, iron, cobalt, zirconium, alloys thereof, or any other magnetic material that can be used to access magnetic information on magnetic media 104. Magnetic head layer 102, though shown as a single contiguous layer, may comprise multiple access elements. Magnetic media 104 may comprise a segment of magnetic tape, a magnetic disk, or any other type of magnetic media capable of storing information accessible by a magnetic media head. The information accessed on magnetic media 104 may be analog, digital, some combination thereof, or any other format used for storing information on magnetic media.

Metallic layer 103 may be comprised of titanium, platinum, tungsten, or any metal or metal alloy that is formed on magnetic head layer 102 in order to prevent wear on magnetic head layer 102 by other elements, such as magnetic media 104 or atmospheric pollutants. For example, magnetic media head 100 may comprise a magnetic tape head and magnetic media 104 may comprise magnetic tape. Magnetic tape is positioned so that it contacts the magnetic tape head and moves over the magnetic tape head in order for the magnetic tape head to read information from or write information to the magnetic tape. As it passes over the magnetic tape head, the magnetic tape may erode the magnetic tape head until the head can no longer function and needs to be replaced. Metallic layer 103 provides a durable coating that helps prevent this wear on magnetic head layer 102.

Conductive metals, in particular, provide the added benefit of shorting out any electromechanical corrosion effects that may occur when accessing magnetic media 104. Thus, metal will protect magnetic head layer 102 from wear, erosion, and corrosion. Moreover, metal tends to be a more durable coating than the insulating materials that are typically used to protect magnetic media heads.

Metallic layer 103 may be applied to magnetic media head 100 using chemical vapor deposition, atomic layer deposition, physical vapor deposition, ion beam deposition, plasma vapor deposition, or any other method of applying metallic material so that metallic layer 103 can perform as described herein.

In a preferred embodiment, metallic layer 103 is composed of metallic titanium. Titanium is a hard wearing, chemically stable, and electrically conducting metal. When exposed to air, the outermost layer of titanium will form titanium dioxide. Titanium dioxide is a very hard material that is not easily worn off by material, such as magnetic tape, abrasively rubbing against the titanium dioxide layer. If for some reason the titanium dioxide layer is worn off, the layer of titanium under the worn off layer will be exposed to the air and form a new layer of titanium dioxide. This process effectively allows titanium to repair itself and allows a metallic layer 103 made of titanium to protect magnetic head layer 102 for much longer than current protective layers.

Advantageously, coating magnetic media head 100 with metallic layer 103 protects magnetic head layer 102 from wear. This allows magnetic media head 100 to last longer before having to be replaced in comparison with magnetic media head 100 being uncoated or even coated with a less durable insulator material.

In some embodiments, metallic layer 103 may be used to protect an optical media head, such as an optical tape or optical disk head, or any other type of media access head from wear.

Figure 2:
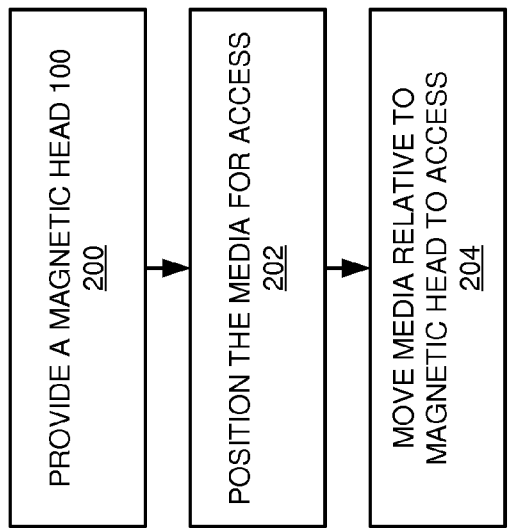
FIG. 2 illustrates a method of using the magnetic media access head.

FIG. 2 illustrates a method of operating magnetic media head 100 to access magnetic media 104. The method provides magnetic media head 100 for accessing magnetic media 104 (step 200). Magnetic media head 100 may be a magnetic tape read and/or write head, a magnetic disk head, such as a hard disk head, or a head for accessing any other type of magnetic media. Similarly, magnetic media may be magnetic tape, a magnetic disk, such as a hard disk platter, or any other type of magnetic media.

Magnetic media 104 is positioned for access by magnetic head layer 102 of magnetic media head 100 (step 202). For example, if magnetic media head 100 is a magnetic tape head, then magnetic media 104 is magnetic tape that is positioned on magnetic media head 100 so as the tape is touching magnetic media head 100. In an alternative example, if magnetic media head 100 is a hard disk head, then magnetic media 104 is a hard disk platter and magnetic media head 100 is placed close enough to the surface of the platter that information can be read from or written to the platter.

Once magnetic media head 100 and magnetic media 104 are positioned appropriately, magnetic media 104 is moved relative to magnetic head layer 102 to magnetically access magnetic media 104 (step 204). In the magnetic tape example from above, this means that magnetic media 104 is moved over magnetic media head 100 so that magnetic media head 100 can access various points along the length of the magnetic tape. Alternatively, in the hard disk example from above, magnetic media head 100 is moved across the platter by an arm while the platter spins under magnetic media head 100.

Figure 3:
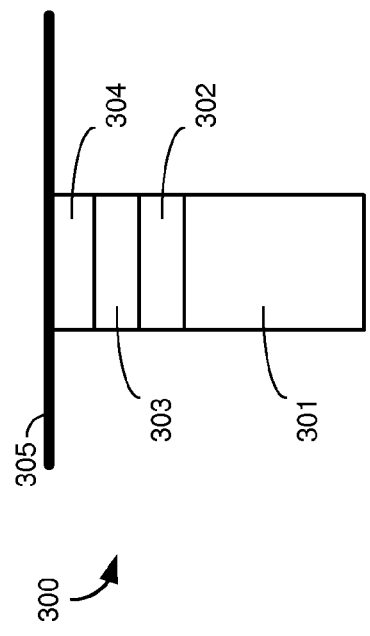
FIG. 3 illustrates a magnetic media access head.

FIG. 3 illustrates a profile view of magnetic media access head 300. Magnetic media access head 300 includes base substrate 301, magnetic head layer 302, insulator layer 303, and metallic layer 304. FIG. 3 further illustrates magnetic media 305 although magnetic media 305 may not always be present when not being accessed by magnetic media head 300. FIG. 3 illustrates that magnetic media 305 is touching magnetic head 300. However, in some embodiments, magnetic media 305 need not be touching magnetic head 300 in order for magnetic head 300 to access magnetic media 305. Furthermore, FIG. 3 is not necessarily drawn to scale.

Base substrate 301 is configured to support magnetic head layer 302. Magnetic head layer 302 is formed on base substrate 301 and is configured to magnetically access magnetic media 305. Insulator layer 303 is formed over magnetic head layer 302 and metallic layer 304 is formed over insulator layer 303. Insulator layer 303 and metallic layer 304 are disposed between magnetic head layer 302 and magnetic media 305 when magnetic media 305 is positioned for access by magnetic head layer 302.

Magnetic media head 300 is illustrated in a profile view to show how the layers are placed relative to one another. Therefore, magnetic media head 300 may take any other shape besides that shown in FIG. 3. Similarly, the shapes of base substrate 301, magnetic head layer 302, insulator layer 303 and metallic layer 304, individually, may take other shapes. For example, magnetic head layer 302 may be inset into base substrate 301. Insulator layer 303 and metallic layer 304 may then be formed to cover both magnetic head layer 302 and at least a portion of base substrate 301.

Base substrate 301 may be composed of aluminum oxide titanium carbide (AlTiC), calcium titanate (CaTiO$_3$), or other material that may support magnetic head layer 302. Magnetic head layer 302 may be composed of nickel, iron, cobalt, zirconium, alloys thereof, or any other magnetic material that can be used to access magnetic information on magnetic media 305. Magnetic head layer 302, though shown as a single contiguous layer, may comprise multiple access elements. Magnetic media 305 may comprise a segment of magnetic tape, a magnetic disk, or any other type of magnetic media capable storing information accessible by a magnetic media head.

Metallic layer 304 may be comprised of titanium, platinum, tungsten, or any metal or metal alloy that is formed on magnetic head layer 302 in order to prevent wear on magnetic head layer 302 by other elements, such as magnetic media 305 or atmospheric pollutants. For example, magnetic media head 300 may comprise a magnetic tape head and magnetic media 305 may comprise magnetic tape. Magnetic tape is positioned so that it contacts the magnetic tape head and moves over the magnetic tape head in order for the magnetic tape head to read information from or write information to the magnetic tape. As it passes over the magnetic tape head, the magnetic tape may erode the magnetic tape head until the head can no longer function and needs to be replaced. Metallic layer 304 provides a durable coating that helps prevent this wear on magnetic head layer 302.

Conductive metals, in particular, provide the added benefit of shorting out any electromechanical corrosion effects that may occur when accessing magnetic media 305. Thus, metal will protect magnetic head layer from wear, erosion, and corrosion of magnetic head layer 302. Moreover, metal tends to be a more durable coating than the insulating materials that are typically used to protect magnetic media heads.

Metallic layer 304 may be applied to magnetic media head 300 using chemical vapor deposition, atomic layer deposition, physical vapor deposition, ion beam deposition, plasma vapor deposition, or any other method of applying metallic material so that metallic layer 304 can perform as described herein.

In a preferred embodiment, metallic layer 304 is composed of metallic titanium. Titanium is a hard wearing, chemically stable, and electrically conducting metal. When exposed to air, the outermost layer of titanium will form titanium dioxide. Titanium dioxide is a very hard material that is not easily worn off by material, such as magnetic tape, abrasively rubbing against the titanium dioxide layer. If for some reason the titanium dioxide layer is worn off, the layer of titanium under the worn off layer will be exposed to the air and form a new layer of titanium dioxide. This process effectively allows titanium to repair itself and allows a metallic layer 304 made of titanium to protect magnetic head layer 302 for much longer than current protective layers.

Insulator layer 303 may be comprised of alumina, titanium dioxide, silicon nitride, aluminum nitride, silicon dioxide, or any other non-conducting material. The inclusion of insulator layer 303 in magnetic media head 300 is for applications of magnetic media head 300 where the electrical integrity of magnetic head layer 302 should not be compromised. An exemplary application where insulator layer 303 is required is in magneto-resistive read devices that are often used in magnetic tape heads. Therefore, if magnetic head layer 302 has one or more magneto-restive read elements, alone or in combination with write elements, magnetic head layer 302 will require insulator layer 303 in between magnetic head layer 302 and metallic layer 304.

It should be understood that, while magnetic media head 300 shows only insulator layer 303 between magnetic head layer 302 and metallic layer 304, there may exist additional layers between magnetic head layer 302 and metallic layer 304.

FIG. 4 illustrates a profile view of magnetic tape head 400. Magnetic tape head 400 includes cover plate 401, base substrate 402, and thin film magnetic structures 403. FIG. 4 further illustrates magnetic tape 404 although magnetic tape 404 may not always be present when not being accessed by magnetic tape head 400. FIG. 4 illustrates that magnetic tape head 400 has only two thin film magnetic structures 403 but some embodiments may have additional thin film magnetic structures formed in base substrate 402 or other sections of base substrate formed on either side of base substrate 402. Furthermore, FIG. 4 is not necessarily drawn to scale.

Base substrate 402 may be composed of aluminum oxide titanium carbide (AlTiC), calcium titanate (CaTiO$_3$), or other material that may support thin film magnetic structures 403. Cover plate 401 may be composed of the same material as base substrate 402 or may be composed of some other material. Thin film magnetic structures 403 may be composed of nickel, iron, cobalt, zirconium, alloys thereof, or any other magnetic material that can be used to access magnetic information on magnetic tape 404.

In operation, magnetic tape 404 passes over tape head 400 as magnetic tape moves from one tape reel to another. This allows thin film magnetic structures 403 to read data from or write data to the length of magnetic tape 404. However, as magnetic tape 404 passes over tape head 400 the tape wears on the surface of thin film magnetic structures 403 and base substrate 402.

FIG. 5 illustrates a profile view of magnetic tape head 500. Similar to magnetic tape head 400, magnetic tape head 500 includes cover plate 501, base substrate 502, and thin film magnetic structures 503. FIG. 5 further illustrates magnetic tape 504 although magnetic tape 504 may not always be present when not being accessed by magnetic tape head 500. FIG. 5 illustrates that magnetic tape head 500 has only two thin film magnetic structures 503 but some embodiments may have additional thin film magnetic structures formed in base substrate 502 or other sections of base substrate formed on either side of base substrate 502. Furthermore, FIG. 5 is not necessarily drawn to scale.

As discussed above, as magnetic tape 504 passes over tape head 500 the tape wears on the surface of thin film magnetic structures 503 and base substrate 502. This wear erodes thin film magnetic structures 503 and base substrate 502 creating a gap 505 between thin film magnetic structures 503 and magnetic tape 504. As magnetic tape 504 erodes thin film magnetic structures 503, gap 505 gets larger and the distance between thin film magnetic structures 503 increases. At some point the distance between thin film magnetic structures 503 and magnetic tape 504 becomes too great for thin film magnetic structures 503 to write data to or read data from magnetic tape 504.

For example, for many modern magnetic tape head applications the gap between thin film magnetic structures 503 and magnetic tape 504 can be a maximum of 15 nanometers (nm) (up to 20 nm with some technologies) for thin film magnetic structures 503 to perform properly. As technology changes, this cutoff distance may decrease thereby decreasing the amount of time that magnetic tape head 500 can be used before wearing out and needing to be replaced.

FIG. 6 illustrates a profile view of magnetic tape head 600. Magnetic tape head 600 includes cover plate 601, base substrate 602, thin film magnetic structures 603, insulator layer 604, and metallic layer 605. FIG. 6 further illustrates magnetic tape 606 although magnetic tape 606 may not always be present when not being accessed by magnetic tape head 600. FIG. 6 illustrates that magnetic tape head 600 has only two thin film magnetic structures 603 but some embodiments may have additional thin film magnetic structures formed in base substrate 602 or other sections of base substrate formed on either side of base substrate 602. Furthermore, FIG. 6 is not necessarily drawn to scale.

Base substrate 602 may be composed of aluminum oxide titanium carbide (AlTiC), calcium titanate (CaTiO$_3$), or other material that may support thin film magnetic structures 603. Cover plate 601 may be composed of the same material as base substrate 602 or may be composed of some other material. Thin film magnetic structures 603 may be composed of nickel, iron, cobalt, zirconium, alloys thereof, or any other magnetic material that can be used to access magnetic information on magnetic tape 606.

In this embodiment, at least one of thin film magnetic structures 603 is a magneto-resistive read element and requires an insulator layer to operate properly. Insulator layer 604 may be comprised of alumina, titanium dioxide, silicon nitride, aluminum nitride, silicon dioxide, or any other non-conducting material. Metallic layer 605 may be comprised of titanium, platinum, tungsten, or any metal or metal alloy that is formed on magnetic head layer 603 in order to prevent wear on magnetic head layer 603 by other elements, such as magnetic media 606 or atmospheric pollutants.

In operation, as magnetic tape 606 passes over tape head 600, magnetic tape 606 wears on metallic layer 605 rather than directly on thin film magnetic structures 603. Moreover, even if metallic layer 605 is ever worn through, then magnetic tape 606 will have to wear through 604 as well before wearing on thin film magnetic structures 603. Thus, the use of metallic layer 605 to protect the thin film magnetic structures 603 greatly increases the amount of time before magnetic tape 606 wears thin film magnetic structures 603 to the point of failure.

FIG. 7 illustrates a profile view of magnetic media access head 700. Magnetic media access head 700 includes base substrate 701, thin film magnetic layer 702, insulator layer 703, and metallic layer 704. FIG. 7 is not necessarily drawn to scale.

As discussed above, if thin film magnetic layer 702 is worn to the point of being too far from the magnetic tape that thin film magnetic layer 702 is accessing, then thin film magnetic layer 702 will not be able to read from or write to the magnetic tape. This same principle holds with regards to the distance between thin film magnetic layer 702 and the magnetic tape that is created by insulator layer 703 and metallic layer 704. Therefore, the thickness of insulator layer 703 and metallic layer 704 should not exceed the maximum distance from which thin film magnetic layer 702 is capable of accessing the magnetic tape.

In a preferred embodiment, insulator layer 703 and metallic layer 704 are a combined 1 to 20 nm in thickness, as shown, while not exceeding the maximum thickness that will still allow proper access to magnetic tape by thin film magnetic layer 702. Insulator layer 703 and metallic layer 704 can satisfy this thickness requirement using any ratio of the two layers, including a ratio where there is no insulator layer 703 and only a metallic layer 704.

FIG. 8 illustrates a profile view of hard disk drive 800. Hard disk drive 800 includes magnetic read/write heads 801 and platter 802. Magnetic read/write heads 801 are positioned over platter 802 using arm 803.

As discussed above, magnetic media access heads are used in more applications than just magnetic tape. In the embodiment of FIG. 8, magnetic read/write heads are used in a hard disk drive application. While magnetic read/write heads 801 do not contact platter 802 when accessing data on platter 802, magnetic read/write heads 801 may still physically contact other parts during operation. For example, arm 803 may rest magnetic read/write heads 801 on a surface when not accessing data on platter 802. Therefore, it may still be beneficial for magnetic read/write heads 801 to use a structure similar to that of magnetic media access head 100 for wear protection.

Figure 9:
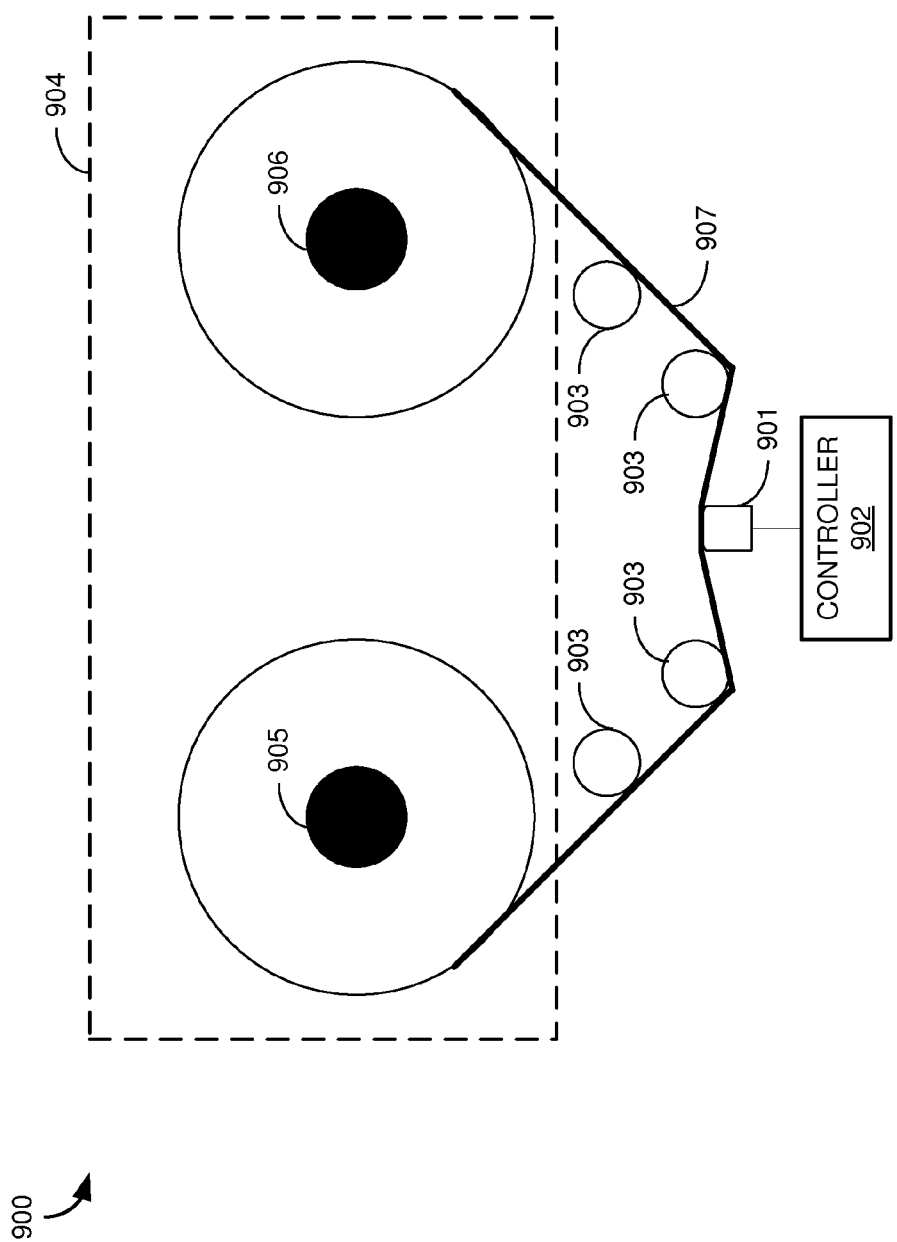
FIG. 9 illustrates a magnetic tape access system.

FIG. 9 illustrates magnetic tape access system 900. Magnetic tape access system 900 includes magnetic tape head 901, controller 902, tape guides 903, tape reel 905, tape reel 906, and magnetic tape 907. Tape reel 905, tape reel 906, and magnetic tape 907 may be enclosed within tape cartridge 904 for ease of use. Elements 901-907 are shown in an exemplary configuration but may take other forms and include additional elements. In some embodiments, magnetic tape access system 900 is contained within an enclosure that accepts tape cartridges like those of tape cartridge 904. Furthermore, magnetic tape access system 900 may be part of a robotic tape library that contains volumes of magnetic tape cartridges and additional magnetic tape access systems.

In some embodiments, tape cartridge 904 includes only a single tape reel 905 and tape reel 906 is an empty reel external to tape cartridge 904. In operation, when tape cartridge 904 is placed into magnetic tape access system 900, magnetic tape 907 is spooled from tape reel 905 onto empty tape reel 906 for accessing information on magnetic tape 907.

Controller 902 comprises a microprocessor, microcontroller, application specific integrated circuit (ASIC), or other control circuitry. Controller 902 may further comprise a memory device that stores operating software, such as firmware, that controller 902 executes to operate magnetic tape access system 900. Magnetic tape heads 100, 300, or 600 may be examples of magnetic tape head 901, though magnetic tape head 901 may take other forms.

When tape cartridge 904 is inserted into tape access system 900, controller 902 directs actuators that move tape guides 903 to position magnetic tape 907 on magnetic tape head 901. Controller 902 then directs electric motors to spin reels that correspond to tape reels 905 and 906 in cartridge 904 to pass magnetic tape 907 over magnetic tape head 901. The tape reels 905 and 906 may be able to spin in both directions so that magnetic tape 907 can pass over magnetic tape head 901 in each direction. Controller 902 operates magnetic tape head 901 to read data from or write data to magnetic tape 907. Controller 902 may receive data for writing to magnetic tape 907 from another system over a communication link. Similarly, controller 902 may transfer data read from magnetic tape 907 to the other system over the communication link.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of manufacturing a magnetic head for accessing magnetic media, comprising:
    applying a non-magnetic metallic layer over a magnetic head layer as an outermost layer of the magnetic head, wherein the non-magnetic metallic layer is disposed between the magnetic head layer and the magnetic media and wherein the non-magnetic metallic layer remains on the magnetic head after manufacturing.

2. The method of claim 1, wherein a base substrate supports the magnetic head layer.

3. The method of claim 1, wherein the magnetic media comprises magnetic tape.

4. The method of claim 1, wherein the magnetic media comprises a magnetic disk.

5. The method of claim 1, wherein an insulator layer is formed between the magnetic head layer and the non-magnetic metallic layer.

6. The method of claim 1, wherein the non-magnetic metallic layer is composed of titanium, platinum, tungsten, or any other metal or metal alloy.

7. The method of claim 1, wherein the non-magnetic metallic layer is from 1 nanometer to 20 nanometers in thickness.

8. A method of operating a magnetic media head, comprising:
    accessing magnetic media with the magnetic media head comprising a magnetic head layer and a non-magnetic metallic layer formed over the magnetic head layer and disposed as an outermost layer of the magnetic head between the magnetic head layer and the magnetic media.

9. The method of claim 8, further comprising:
    positioning the magnetic media for access by the magnetic head layer.

10. The method of claim 9, wherein accessing the magnetic media comprises:
    moving the magnetic media relative to the magnetic head layer.

11. The method of claim 8, wherein the magnetic media comprises magnetic tape.

12. The method of claim 8, wherein the magnetic media comprises a magnetic disk.

13. The method of claim 8, wherein the magnetic media head further comprises:
    a base substrate configured to support the magnetic head layer, wherein the magnetic head layer is formed on the base substrate.

14. The method of claim 8, wherein the magnetic media head further comprises an insulator layer formed between the magnetic head layer and the non-magnetic metallic layer.

15. The method of claim 8, wherein the non-magnetic metallic layer is composed of titanium, platinum, tungsten, or any other metal or metal alloy.

16. The method of claim 8, wherein the non-magnetic metallic layer is from 1 nanometer to 20 nanometers in thickness.

17. The method of claim 8, wherein accessing the magnetic media comprises reading data from or writing data to the magnetic media.

* * * * *